US006392872B1

(12) United States Patent
Doustou, III et al.

(10) Patent No.: US 6,392,872 B1
(45) Date of Patent: May 21, 2002

(54) COMPUTER SYSTEM

(75) Inventors: James Doustou, III, Wrentham; Ralph Larsen, South Lancaster; Klaus J. Schneller, Milford; Arthur R. Nigro, Jr., Hopkinton, all of MA (US)

(73) Assignee: EMC Corporation, Hopkinston, MA (US)

( * ) Notice: Subject to any disclaimer, the term of this patent is extended or adjusted under 35 U.S.C. 154(b) by 0 days.

(21) Appl. No.: 09/268,416

(22) Filed: Mar. 15, 1999

(51) Int. Cl.$^7$ .................................................. H05K 7/20
(52) U.S. Cl. ...................... 361/681; 361/680; 361/683; 361/695; 174/52.1; 174/66; 174/67
(58) Field of Search ................................. 361/681, 680, 361/682–687, 653, 724, 695, 694, 692, 831, 727; 174/52.1, 66, 67

(56) References Cited

U.S. PATENT DOCUMENTS

| | | | | | |
|---|---|---|---|---|---|
| 5,332,306 | A | * | 7/1994 | Babb et al. | 312/334.16 |
| 5,596,483 | A | * | 1/1997 | Wyler | 361/683 |
| 5,691,883 | A | * | 11/1997 | Nelson | 361/683 |
| 5,745,041 | A | * | 4/1998 | Moss | 340/635 |
| 5,777,848 | A | * | 7/1998 | McAnally et al. | 361/725 |
| 6,058,011 | A | * | 5/2000 | Hardt et al. | 361/694 |
| 6,064,571 | A | * | 5/2000 | Noble | 361/695 |
| 6,115,250 | A | * | 9/2000 | Schmitt | 361/695 |
| 6,175,490 | B1 | * | 1/2001 | Papa et al. | 361/686 |
| 6,198,629 | B1 | * | 3/2001 | Cannon et al. | 361/695 |
| 6,234,591 | B1 | * | 5/2001 | Driscoll et al. | 312/9.56 |

* cited by examiner

Primary Examiner—Leo P. Picard
Assistant Examiner—David Foster
(74) Attorney, Agent, or Firm—Kriegsman & Kriegsman (57) ABSTRACT

A computer system includes a chassis which is generally U-shaped in lateral cross-section and a cover which together define an internal cavity. A fan pack for cooling the computer system is removably disposed within the internal cavity. The fan pack includes three stacked pairs of individual fan units which are disposed in a row within a rectangular housing. The computer system also includes three power supplies for providing power for the computer system, each power supply being slidably disposed within associated power supply receiving channel formed in the chassis. Each power supply includes a housing, power supply electronics disposed within the housing, and a male electrical connector having both alternating and direct current connection capabilities. The male electrical connector is mounted on the housing in electrical connection with the power supply electronics and includes a frame, a pair of spaced apart alternating current (AC) connection pins disposed within the frame and a plurality of direct current (DC) connection pins disposed within the frame. The computer system further includes an indicator unit for displaying the operation state of the computer system. The indicator unit includes a hollowed housing mounted on the chassis and indicator unit electronics disposed within the housing. The indicator unit electronics include a printed circuit board having a top surface, a bottom surface and a line of weakness which enables for the printed circuit board to be divided into two separate pieces. The indicator unit electronics include an LED display mounted on the printed circuit board and a flexible connector having a first and second ends which are mounted on the printed circuit board on opposite sides of the line of weakness so as to electrically connect the printed circuit board upon separation through the line of weakness.

14 Claims, 9 Drawing Sheets

COMPUTER SYSTEM

BACKGROUND OF THE INVENTION

The present invention relates generally to computers and more particularly to computer systems which are used as network servers.

Computers, such as personal computers, are often interconnected to form a communication network which enables information (i.e., data or files) to be passed from one computer to another computer. In a communication network, it is well known for a single computer to transmit large amounts of information to the remainder of the computers which constitute the communication network. In this circumstance, the single computer acts as a network server which provides information that is shared by numerous network clients.

A network server, also commonly referred to as server, enables many individual clients to access information that is stored within the single server. For example, servers are commonly used to host web sites which can be accessed by many individual computers through the Internet.

The establishment of a client-server computer network creates numerous advantages. For example, a client-server relationship enables multiple clients to concurrently access information stored on a single server. In addition, a client-server relationship enables information to be added or modified to the single server rather than to each of the individual clients, thereby reducing the overall cost to maintain the network.

One type of server which is well-known and which is commonly used in commerce is the AViiON dual processor high-density server, model AV20000, which is manufactured by Data General Corporation of Westborough, Mass.

Network server computer systems typically comprise a rectangular housing which sized and shaped to be disposed within a rack console, or cabinet, in a stacked relationship. Network servers preferably have a height which complies with industry NEMA standards (i.e., a 7-U height of approximately 12.25 inches).

The housing for network server computer systems commonly divides the computer system into two principal sections, namely, an electronics bay and a power/peripherals bay. The electronics bay is typically disposed in the rear of the computer system and holds most of the electronics of the computer system, such as the motherboard, central processing units (CPUs), input/output boards, disc drives, memory modules, and processor modules. The power/peripherals bay is typically disposed in the front of the computer system and holds the power supplies and peripherals for the computer system, such as the fan pack and disc modules.

The fan pack for most network server computer systems is disposed near the center of the housing and serves to cool the interior of the computer system. Specifically, the fan pack serves to pull air in through the front of the computer system and exhausts air out through the back of the computer system. It should be noted that the function of the fan pack is critical because increased temperature levels within the housing can cause the computer system to experience operation failure.

The fan pack for a network server computer system often comprises a fan pack housing and three, large, high volume fans which are disposed in a row in side-by-side relationship within the fan pack housing.

It should be noted that fan packs of this particular construction experience a notable drawback. Specifically, it has been found that, on occasion, one of the high volume fans of the fan pack will malfunction during the life of the computer system. As a result, the malfunctioning fan ceases to operate, thereby terminating the flow of cool air through a portion of the computer system. The failure of one fan in the fan pack to produce a flow of cool air therethrough can cause the temperature in the interior of the computer system to rise to a level which can cause operation failure for the computer system, which is highly undesirable.

The power supplies for most network server computer systems are slidably disposed within the front of the housing and serve to provide the requisite power for the computer system to operate. Each power supply typically comprises a rectangular housing and power supply electronics disposed with the housing. Each power supply further comprises an alternating current (AC) electrical connector and a direct current (DC) electrical connector which are mounted on the outer surface of one end of the power supply housing and which are electrically connected to the power supply electronics that are disposed within the power supply housing. It should be that the AC electrical connector and the DC electrical connector are conventionally spaced apart on the power supply housing in order to comply with safety regulations. In use, each power supply can be slidably disposed within the computer system so that the AC electrical connector and the DC electrical connector matingly engage with associated electrical connectors which are permanently secured to the computer system.

It should be noted that power supplies of this particular construction experience multiple drawbacks. As a first example, power supplies which comprise two electrical connectors are relatively complicated in its electrical design and connection, thereby increasing the overall cost of manufacturing for the computer system, which is highly undesirable. As a second example, power supplies which comprise two electrical connectors tend to increase the complexity and ease in properly aligning the electrical connectors with its associated mating connector within the computer system, which is highly undesirable.

Accordingly, it is an object of the present invention to provide a new and improved computer system.

It is also an object of the present invention to provide a computer system having a housing sized and shaped to be disposed within a rack console.

It is another object of the present invention to provide a computer system as described above which includes a fan pack for cooling the interior of the housing.

It is yet another object of the present invention to provide a computer system as described above in which the fan pack is reliable and effective.

It is still another object of the present invention to provide a computer system as described above which includes a power supply slidably disposed within the housing for providing power to the computer assembly.

It is another object of the present invention to provide a computer system as described above in which the power supply is simple in construction and can be easily installed into the housing for the computer assembly.

It is yet another object of the present invention to provide a computer system as described above which has a limited number of parts, which is inexpensive to manufacture and which is easy to use.

SUMMARY OF THE INVENTION

Accordingly, there is provided a computer system comprising a housing having a chassis and a cover mounted on the chassis, the chassis comprising an inner surface, an outer surface, a front panel, a rear panel, a bottom panel and a pair of upstanding sidewalls which together define an internal cavity, the front panel of the chassis being shaped to include a power supply receiving channel, and a fan pack removably disposed within the internal cavity of the housing, said fan pack comprising a first stacked pair of individual fan units.

Various other features and advantages will appear from the description to follow. In the description, reference is made to the accompanying drawings which form a part thereof, and in which is shown by way of illustration, a specific embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

A fuller understanding of the nature and objects of the present invention will become apparent upon consideration of the following detailed description taken in connection with the accompanying drawings, wherein like reference numerals represent like parts.

DETAILED DESCRIPTION OF THE PREFERRED EMBODIMENT

Referring now to the drawings, there is shown a computer system constructed according to the teachings of the present invention, the computer system being identified generally by reference numeral 11. Computer system 11 is of the type which can be used as a server for a network communication system. Preferably, computer system 11 is an AViiON NT server computer system, model 3704, which is manufactured by Data General Corporation of Westborough, Mass.

Computer system 11 is sized and shaped to be slidably disposed within a generally rectangular rack console, or cabinet, which is constructed to meet NEMA industry size and dimension standards (i.e., a 19 inch NEMA rack console). Preferably, computer system 11 is a 4u computer system which has a height h of approximately 7 inches.

Figure 1:
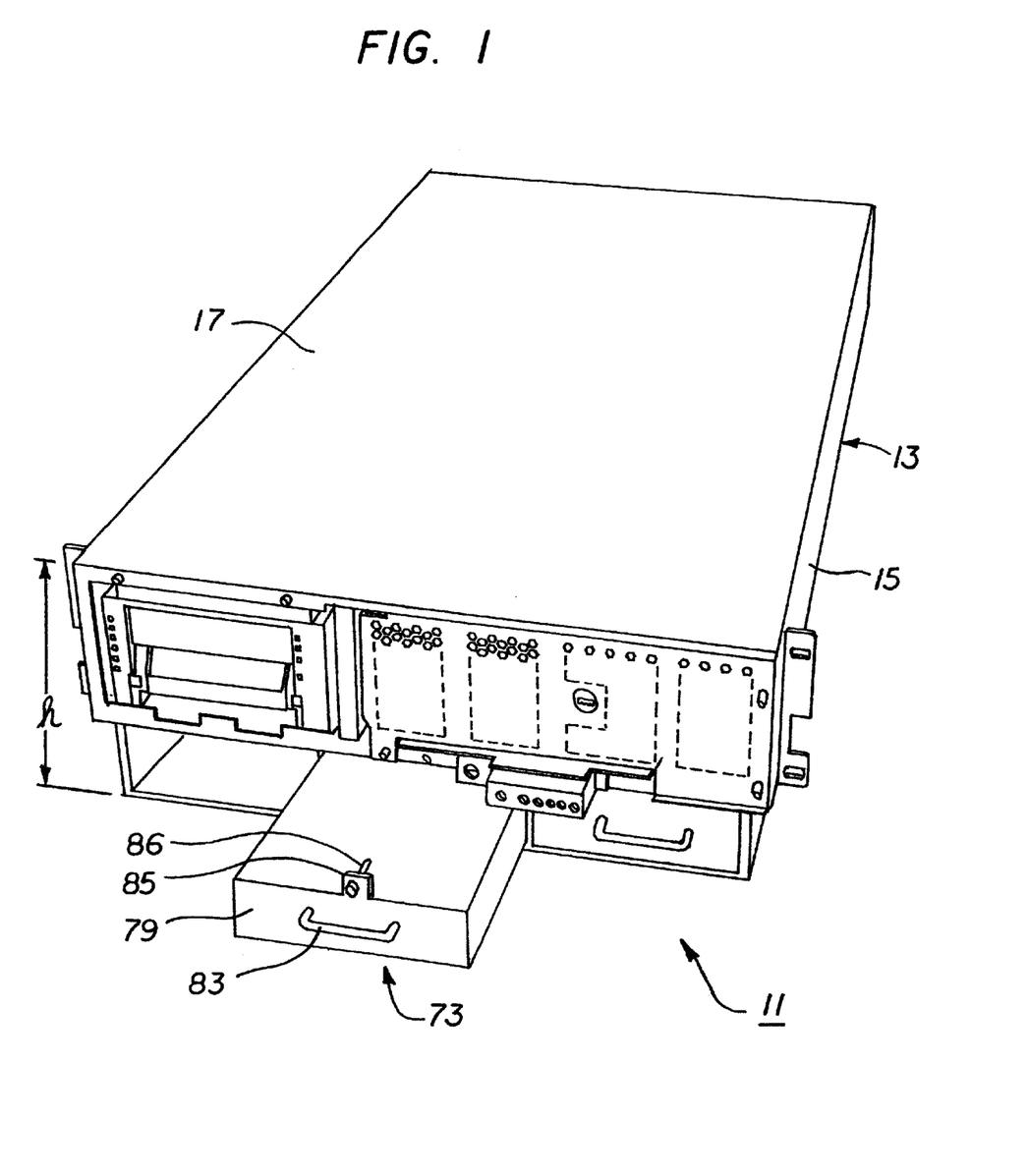
FIG. 1 is a front perspective view of a computer system constructed according to the teachings of the present invention, the computer system being shown with one power supply removed from the chassis.

Computer system 11 comprises a rectangularly shaped housing 13 constructed of a rigid and durable material, such as sheet metal. Housing 13 comprises a chassis, or base frame, 15 and a cover 17 which is mounted on chassis 15.

Figure 2:
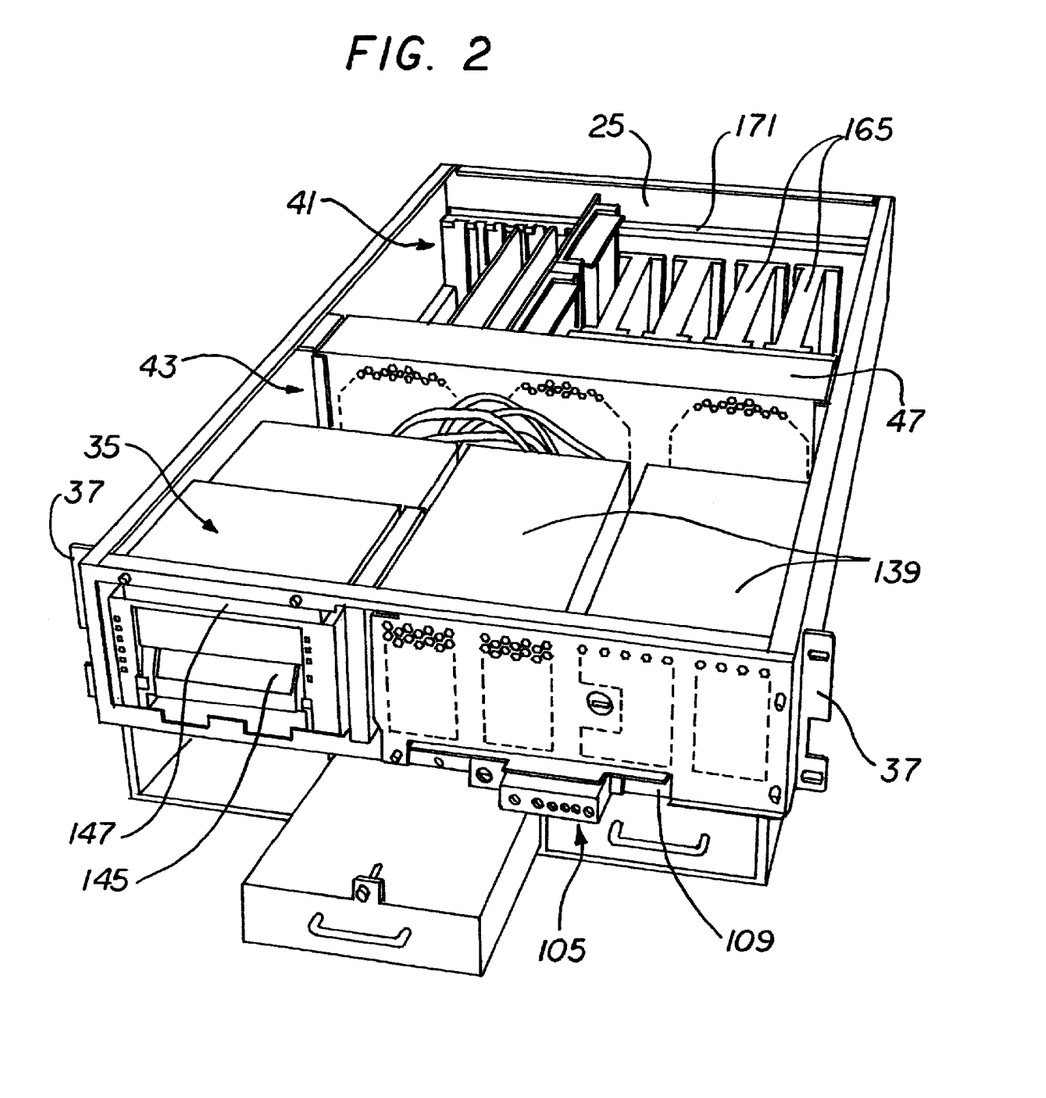
FIG. 2 is a front perspective view of the computer system shown in FIG. 1, the computer system being shown with the cover removed.

Chassis 15 is generally U-shaped in lateral cross-section and comprises an inner surface 19 and an outer surface 21. Chassis 15 also comprises a front panel 23, a rear panel 25, a bottom panel 27, and a pair of upstanding sidewalls 29-1 and 29-2 which, together with cover 17, define an internal cavity, or interior, 31.

Front panel 23 of chassis 15 is shaped to include three power supply receiving channels 33 which are disposed in a row in side-to-side relation. Front panel 23 is also shaped to include a media bay assembly opening (not shown) into which a media bay assembly 35 can be disposed, which will be discussed further in detail below. A pair of outwardly protruding brackets 37 are affixed to outer surface 21 of sidewalls 29 proximate front panel 23. Brackets 37 enable screws, bolts or other securing devices (not shown) to fixedly mount computer system 11 onto a larger computer unit, such as a rack console.

Figure 3:
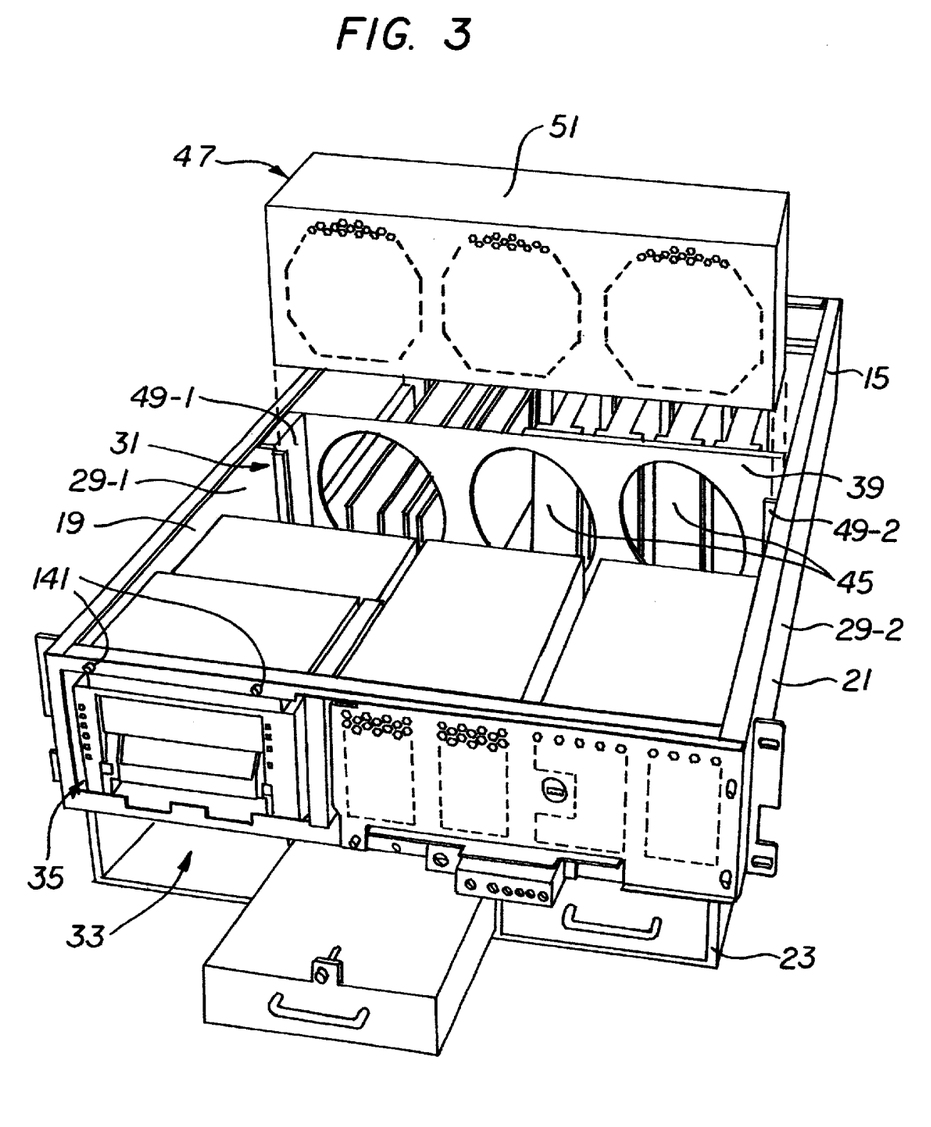
FIG. 3 is a front, partially exploded, perspective view of the computer system shown in FIG. 2, the computer system being shown with the fan pack exploded from the chassis.

Chassis 15 further comprises a separation panel 39 which is fixedly mounted onto inner surface 19 of sidewalls 29. Separation panel 39 is disposed at the approximate midpoint between front panel 23 and rear panel 25 and serves to divide internal cavity 31 into an electronics bay 41 located between separation panel 39 and rear panel 25 and a power/peripherals bay 43 located between separation panel 39 and front panel 23. Separation panel 39 is a thin, generally rectangular piece of sheet metal and comprises three circular openings 45 formed therein which enable air to flow between electronics bay 41 and power/peripherals bay 43, as shown in FIG. 3.

Computer system 11 also comprises a fan pack 47 removably disposed within power/peripherals bay 43 for cooling internal cavity 31. Fan pack 47 is slidably disposed within power/peripherals bay 43 in front of separation panel 39 and is retained in place by first and second inwardly projecting brackets 49-1 and 49-2 which are permanently affixed to inner surface 19 of sidewalls 29-1 and 29-2, respectively. In use, fan pack 47 serves to pass cool air from power/peripherals bay 43, through openings 45 formed in separation panel 39 and into electronics bay 41.

Figure 4:
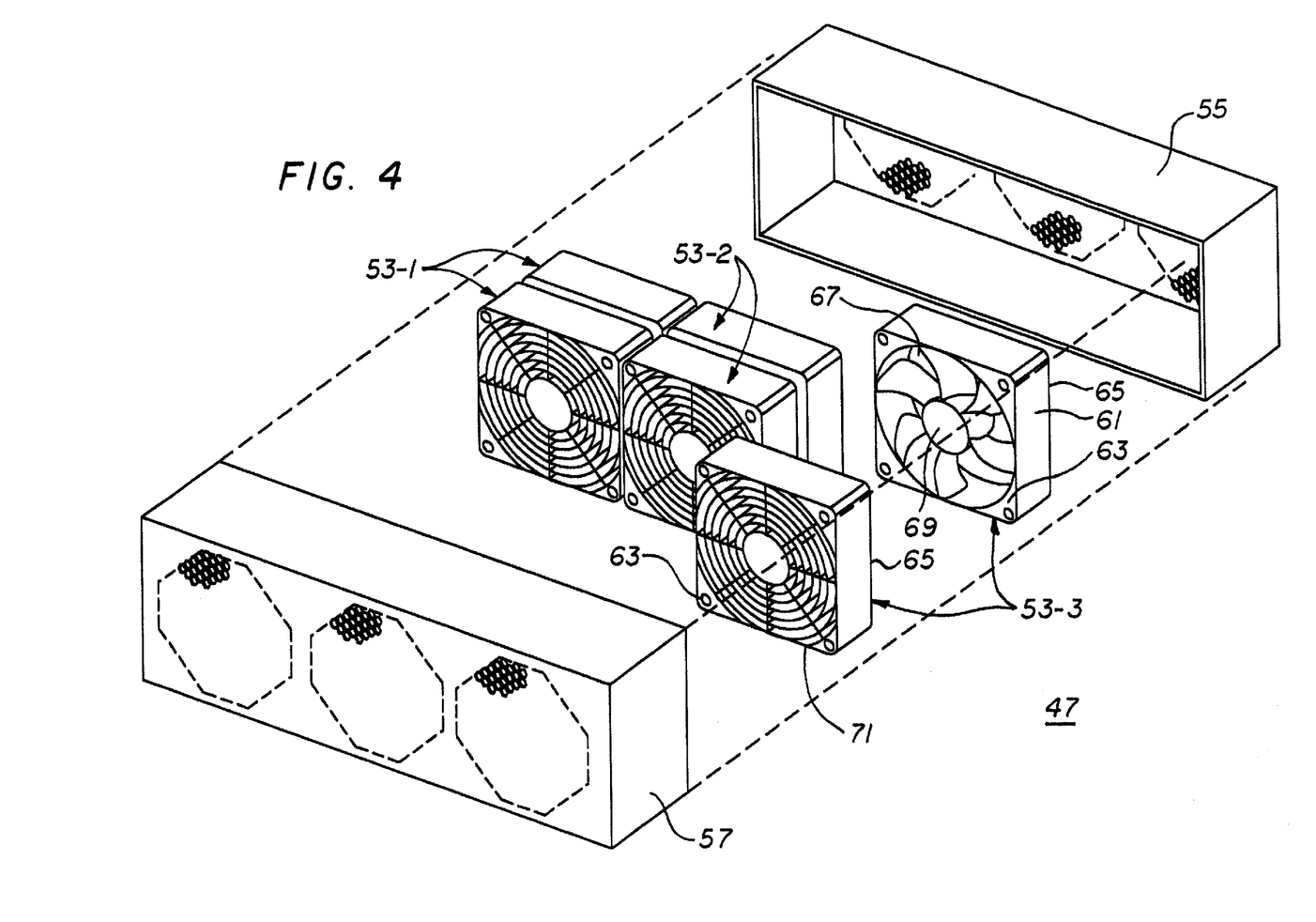
FIG. 4 is an exploded, perspective view of the fan pack shown in FIG. 3, one of the individual fans being shown without a grill cover mounted on its front surface.

Referring now to FIG. 4, there is shown an exploded, perspective view of fan pack 47. Fan pack 47 comprises a generally rectangular housing 51 and six, small volume, individual fan units 53 disposed within housing 51, individual fan units 53 being electrically connected to one another in parallel. Housing 51 is constructed of a rigid, material, such as sheet metal, and comprises a rear member 55 and a front member 57 which is sized and shaped to be removably slid over rear member 55 to make fan pack 47 a unitary device. Rear member 55 and front member 57 each comprise a plurality of openings 59 arranged in a honeycomb configuration which enable air to pass through fan pack 47.

Each of individual fan units 53 includes a rectangular fan housing 61 which comprises a front surface 63, a rear surface 65 and a central circular opening 67 formed therethrough. Each of individual fan units 53 also comprise a fan blade assembly 69 which is rotatably disposed within central circular opening 67, fan blade assembly 69 serving to draw air in through front member 57 and exhaust air out through rear member 55. A grill cover 71 is mounted on front surface 63 of each fan housing 61; However, grill covers 71 are not essential to the operation of fan units 53 and accordingly, could be removed from fan housings 61 without departing from the spirit of the present invention.

Individual fan units 53 are arranged into a first stacked pair, or column, of fan units 53-1, a second stacked pair, or column, of fan units 53-2 and a third stacked pair, or column, of fan units 53-3, each pair of fan units 53 having rear surface 65 of one fan unit 53 in abutment against front surface 63 of the other fan unit 53. First pair of fan units 53-1, second pair of fan units 53-2 and third pair of fan units 53-3 are disposed in a row within fan housing 51 in a side-by-side relationship to provide air flow throughout the width of internal cavity 31.

It should be noted that although fan pack 47 shows three stacked pairs, or columns, of individual fan units 53, different numbers of columns could be used without departing from the spirit of the present invention. In addition, although each column includes a pair of individual fan units 53, it is to be understood that additional fan units 53 could be included in each column without departing from the spirit of the present invention.

As can be appreciated, the particular configuration of individual fan units 53 provides fan pack 47 with two principal advantages over fan packs which are well known in the art.

As a first advantage, stacking a pair of reduced volume individual fan units 53 into a column, rather than employing a single, high volume individual fan unit for each column, significantly increases the level of airflow produced by fan pack 47, thereby increasing the level of cooling within computer system 11, which is a principal object of the present invention. Specifically, because the level of air flow through the stacked pair of individual fan units 53 which constitute each column is additive, each column produces approximately 40%–50% more airflow than a single, high volume individual fan unit.

As a second advantage, stacking a pair of reduced volume individual fan units 53 into a column provides fan pack 47 with redundant, or n+1, cooling capabilities. Specifically, because each column comprises a stacked pair of individual fan units 53, if one fan unit 53 in a column experiences operation failure, the other fan unit 53 in the column will continue to function in a manner which will maintain adequate cooling within interior cavity 31. As a consequence, malfunction of a single individual fan unit 53 will not cause the temperature within interior cavity 31 to rise to a level which will cause computer system 11 to experience operation failure, thereby making fan pack 47 more reliable, which is a principal object of the present invention.

Computer system 11 further comprises three power supplies 73 which are identical in construction and function. Each of power supplies 73 is slidably and removably disposed within an associated power supply receiving channel 33 formed in chassis 15. Together power supplies 73 serve to provide the requisite power for computer system 11 to operate. Preferably power supplies 73 are connected to computer system 11 so as to provide n+1 capabilities, thereby enabling computer system 11 to operate with one power supply 73 removed therefrom.

Figure 5:
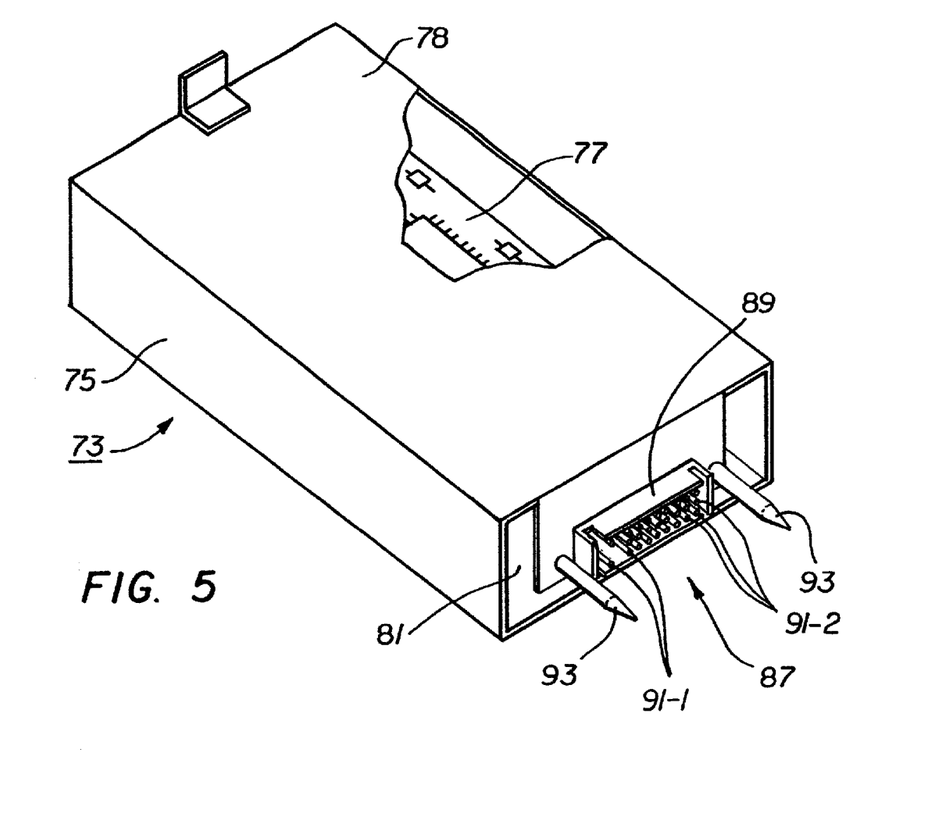
FIG. 5 is a rear perspective view, broken away in part, of one of the power supplies shown in FIG. 1.

Each power supply 73 comprises a rectangular, hollowed, box-shaped housing 75 and power supply electronics 77 disposed within housing 75. Housing 75 is constructed of a rigid and durable material, such as sheet metal, and comprises an outer surface 78, a front end 79 and a rear end 81. A handle 83 is mounted on outer surface 78 of front end 79 to facilitate handling of power supply 73. A tab 85 is formed on front end 79 which enables a screw 86 to fixedly secure power supply 73 onto chassis 15.

Each power supply 73 also comprises a male electrical connector 87 fixedly mounted on outer surface 78 of rear end 81. Electrical connector 87 is electrically connected to power supply electronics 77 and provides both alternating and direct current connection capabilities for power supply 73, as will be described further in detail below.

Electrical connector 87 comprises a thin, rectangular frame 89 which protrudes out from outer surface 78 of rear end 81. Electrical connector 87 further comprises a pair of alternating current (AC) connector pins 91-1 and twenty-four direct current (DC) connector pins 91-2, DC connector pins 91-2 being spaced apart from AC connector pins 91-1. Connector pins 91 project out from outer surface 78 of rear end 81 within frame 89 and serve to electrically connect power supply 73 to computer system 11. The pair of AC connector pins 91-1 are configured in a vertical column in spaced apart a relation. The twenty-four DC connector pins 91-2 are configured into eight vertical columns of three pins, as shown in FIG. 5.

Each power supply 73 further comprises a pair of guide pins 93 which are disposed on opposite sides of electrical connector 87. Guide pins 93 project out from outer surface 78 of rear end 81 and serve to guide power supply 73 into position within power supply receiving channel 33.

Figure 6:
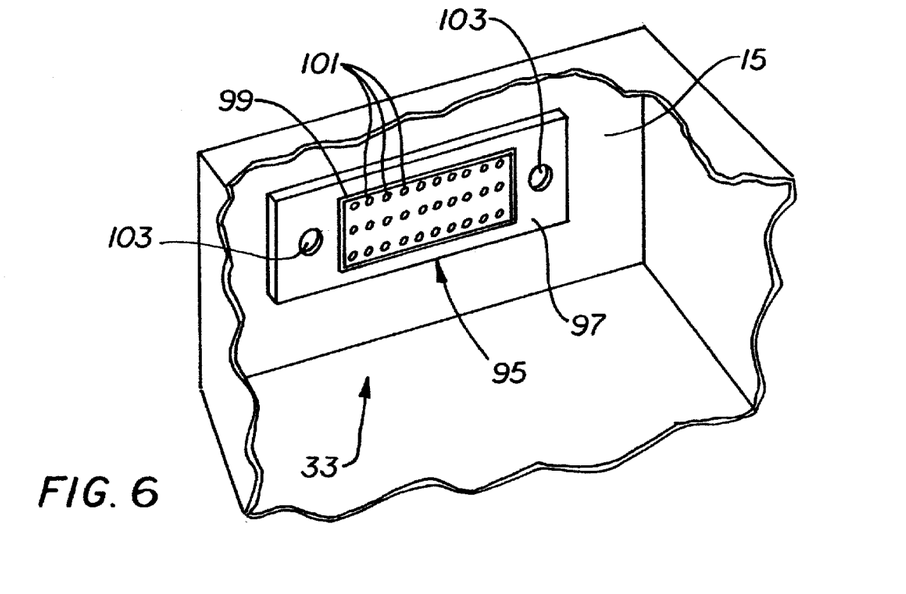
FIG. 6 is an enlarged, front perspective view, broken away in part, of one of the power supply receiving openings defined by the chassis shown in FIG. 1.

Referring now to FIG. 6, a female electrical connector 95 is fixedly mounted onto chassis 15 within each power supply receiving channel 33. Female electrical connector 95 is electrically connected to computer system 11 and is sized and shaped to matingly engage with male electrical connector 87 to enable each power supply 73 to provide power for computer system 11, as will be described in detail below.

Electrical connector 95 comprises a generally rectangular platform 97 which protrudes out from chassis 15 and into power supply receiving channel 33. Electrical connector 95 also comprises a thin, rectangular frame recess 99 which is formed in platform 97, frame recess 99 being sized and shaped to receive frame 89 of electrical connector 87. Electrical connector 95 further comprises thirty, small, cylindrical electrical pin openings 101 which are formed in platform 97. Electrical pin openings 101 are configured in ten vertical columns of three electrical pin openings 101 and are sized and shaped to receive connector pins 91 of electrical connector 87. A pair of guide pin reception holes 103 are formed on platform 97 on opposite sides of electrical pin openings 101, reception holes 103 being sized and shaped to receive guide pins 93.

In use, each power supply 73 is slidably disposed within an associated power supply reception channel 33 in chassis 15. As power supply 73 is advanced into its associated power supply reception channel 33, guide pins 93 project into reception holes 103 to align male electrical connector 87 into mating engagement with female electrical connector 95. Specifically, further advancement of power supply 73 causes frame 89 to project into frame recess 99 and connector pins 91 to project into electrical pin openings 101, thereby electrically and mechanically coupling male electrical connector 87 to female electrical connector 95.

It should be noted that housing 75 of power supply 73 is sized and shaped to be slightly smaller than power supply reception channel 33. As a result, power supply 73 is capable of substantial movement, or wiggle room, within power supply reception channel 33, thereby accommodating for mounting tolerances between fixedly mounted male electrical connector 87 and fixedly mounted female electrical connector 95.

As can be appreciated, implementing AC and DC connection capabilities within single electrical connector 87 provides power supply 73 with two principal advantages over power supplies which are well known in the art.

As a first advantage, because AC and DC connection capabilities are achieved through single electrical connector 87 rather than two separate electrical connectors, the cost for manufacturing power supply 73 is greatly reduced, which is a principal object of the present invention.

As a second advantage, because AC and DC connection capabilities are achieved through single electrical connector 87 rather than two separate electrical connectors, proper alignment of power supply 73 within power supply reception channel 33 is contingent only upon the mating engagement of male electrical connector 87 with female electrical connector 95, thereby simplifying installation of power supply 73, which is a principal object of the present invention.

Figure 7:
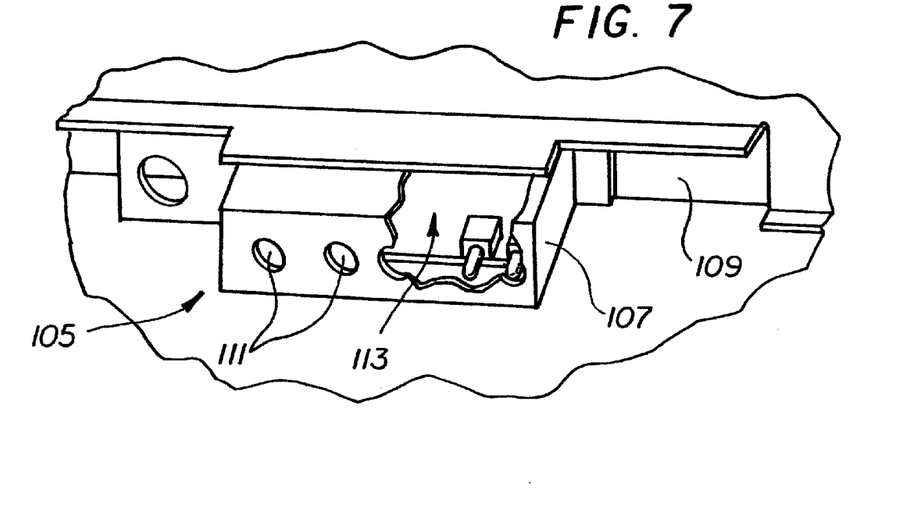
FIG. 7 is an enlarged, perspective view of the indicator unit shown in FIG. 1, the indicator unit being shown with the indicator unit housing broken away in part.

Referring now to FIG. 7, computer system 11 further comprises an indicator unit 105 for notifying the user of the state of operation of computer system 11. Indicator unit 105 comprises a hollowed indicator housing 107 which is fixedly mounted onto an elongated flange 109 formed on front panel 23 of chassis 15. Indicator housing 107 protrudes out from elongated flange 109 and comprises a plurality of openings 111 formed therein.

Indicator unit 105 further comprises indicator unit electronics 113 which are disposed within housing 107 in electrical connection with computer system 11. Indicator unit electronics 113 comprise a printed circuit board 115, a pair of light emitting diode (LED) displays 117 mounted on circuit board 115 and a ribbon cable 119 mounted on circuit board 115.

Figure 8:
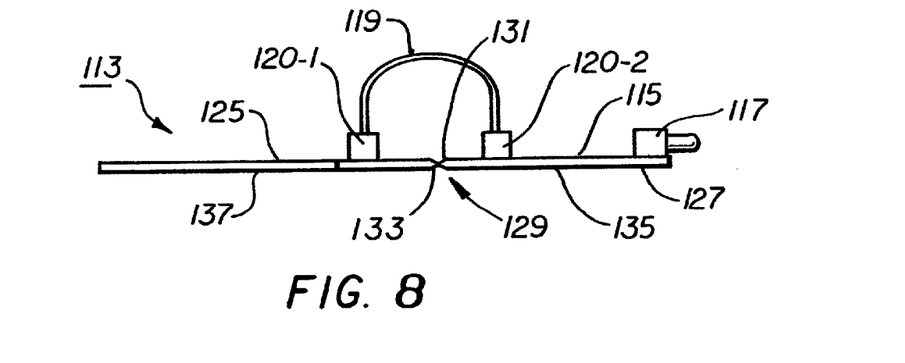
FIG. 8 is a side view of the indicator unit electronics shown in FIG. 7.
Figure 9:
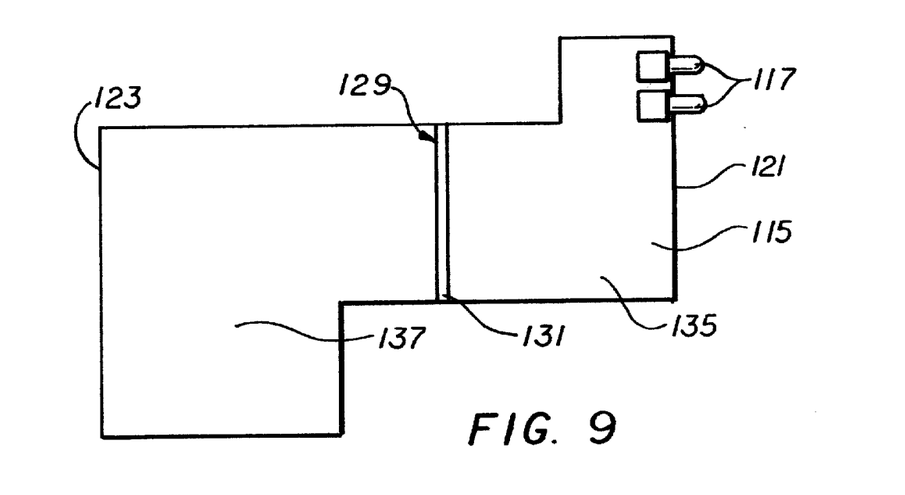
FIG. 9 is a top plan view of the indicator unit electronics shown in FIG. 7, the indicator unit electronics being shown with the ribbon cable removed.

Printed circuit board 115 is generally Z-shaped and comprises a front edge 121, a back edge 123, a top surface 125 and a bottom surface 127. Printed circuit board 115 further comprises a line of weakness 129 formed at the approximate midpoint between front edge 121 and back edge 123. Line of weakness 129 is formed by a Vshaped groove 131 in top surface 125 and a V-shaped groove 133 in bottom surface 127; However, it is to be understood that line of weakness 129 could be created by alternative methods for forming a cut line without departing from the spirit of the present invention.

LED displays 117 are electrically coupled to top surface 125 of circuit board 115 along front edge 121. LED displays 117 are disposed to project out through openings 111 formed in housing 107 so as to indicate to the user the state of operation of computer system 11.

Ribbon cable 119 comprises a first end 120-1 electrically coupled to top surface 125 of circuit board 115 and a second end 120-2 electrically coupled to top surface 125 of circuit board 115. First and second ends 120-1 and 120-2 of ribbon cable 119 are coupled to top surface 125 of circuit board 115 on opposite sides of line of weakness 129 so as to enable electrical signals to pass over line of weakness 129. It is to be understood that indicator unit 105 is not limited to ribbon cable 119 but rather could be replaced with alternative types of flexible electrical connectors, such as a flex circuit or wires, without departing from the spirit of the present invention.

In use, circuit board 111 is snap-cut along line of weakness 129, thereby dividing circuit board 111 into a front circuit board portion 135 and a rear circuit board portion 137 which are mechanically and electrically connected by ribbon cable 119. Front circuit board portion 135 and rear circuit board portion 137 are disposed on opposite sides of elongated flange 109 with ribbon cable 119 flexibly extending over flange 109 so as to electrically connect front portion 131 with rear portion 133.

As can be appreciated, the particular construction of indicator unit 105 eliminates the need to cut or remove a portion of elongated flange 109. This is significant because flange 109 is critical for maintaining the structural strength and overall integrity of chassis 15, which is a principal object of the present invention.

Media bay assembly 35 and a plurality of signal connection architecture (SCA) disc modules 139 are additionally disposed within power/peripherals bay 43. Media bay assembly 35 is slidably disposed within a media bay assembly opening (not shown) formed in front panel 23 of chassis 15 and is fixedly secured thereto by means of rivets 141, or other similar device.

Figure 10:
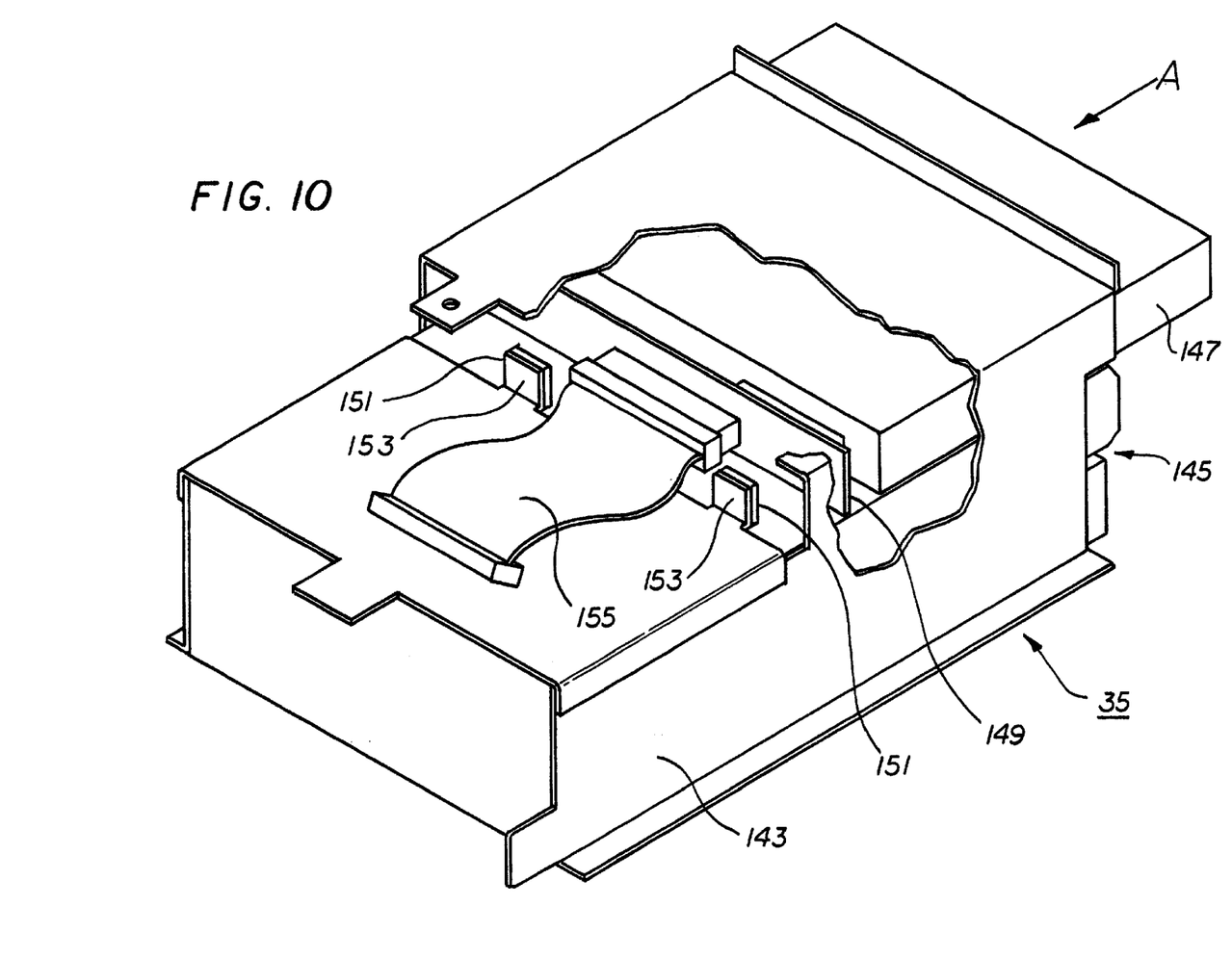
FIG. 10 is a rear, perspective view, broken away in part, of the media bay assembly shown in FIG. 1, the media bay assembly shown with the compact disc (CD) unit partially removed.

Referring now to FIG. 10, media bay assembly 35 comprises a frame 143, a single full height DLT tape drive 145 disposed within frame 143 and a micro compact disc (CD) unit 147 disposed within frame 143. It should be noted that media bay assembly 35 is not limited to including tape drive 145 and CD unit 147 but rather could include alternative types of micro media devices, such as multiple half height tape drives, without departing from the spirit of the present invention.

During the installation process of CD unit 147 within frame 143, CD unit 147 is slid in a rearward direction, as noted by arrow A in FIG. 10. CD unit 147 is disposed within frame 143 until a circuit board 149, which mechanically and electrically coupled to CD unit 147, abuts against a double-sided adhesive tab 151 which, in turn, is secured onto an upwardly protruding flange 153 formed on frame 143, thereby securing CD unit 147 within frame 143. Circuit board 149 comprises an electrical connector 155, such as a ribbon cable, for electrically connecting CD unit 147 to computer system 11.

Figure 11:
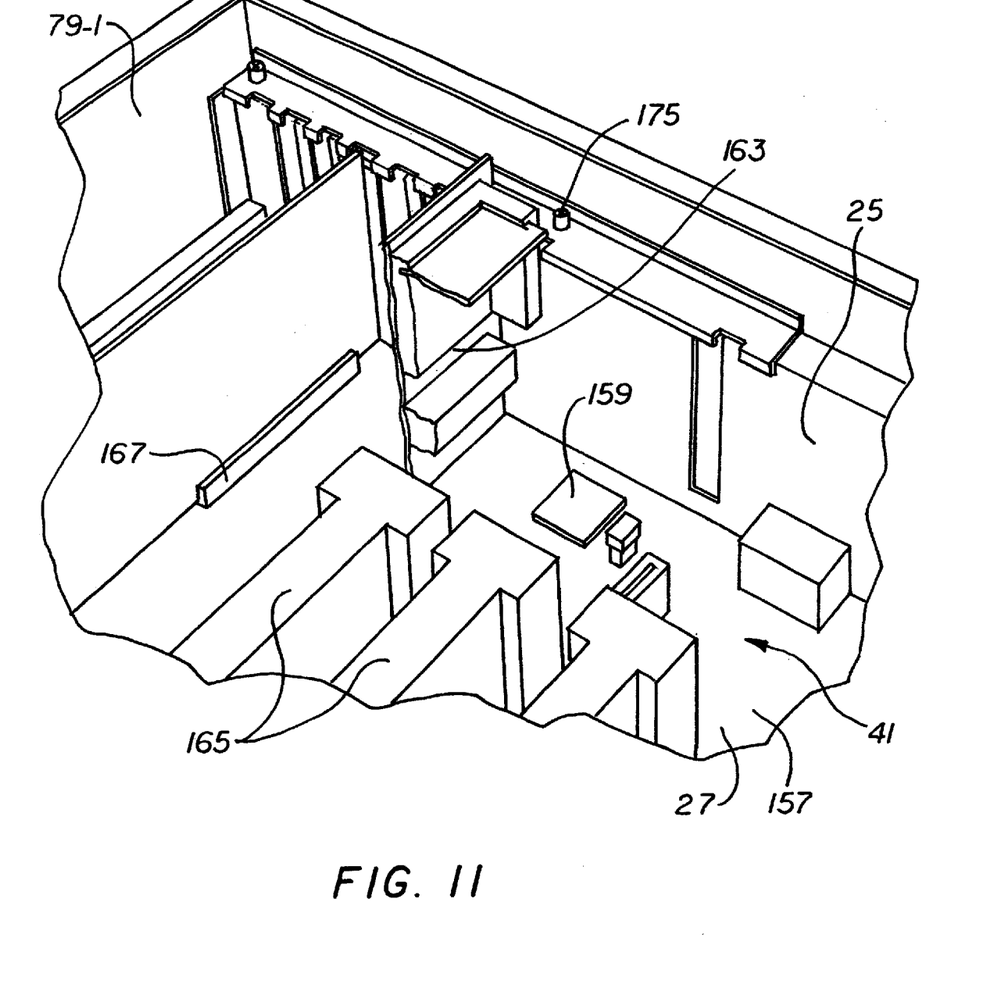
FIG. 11 is a fragmentary, top perspective view of the computer system shown in FIG. 2.

Referring now to FIG. 11, a motherboard 157 is fixedly mounted on inner surface 19 of bottom panel 27 within electronics bay 41. Motherboard 157 is the main logic board for computer system 11.

Integrated circuit (IC) chip central processing units (CPUs) are 159, such as 450 MHz processors, input/output (I/O) boards 161, memory modules 163 and processor modules 165 are electrically and mechanically coupled onto motherboard 157. Preferably, multiple processor modules 165 are connected to motherboard 157 in parallel to provide symmetric multiprocessing, thereby enabling computer system 11 to perform separate tasks at the same time.

Figure 12:
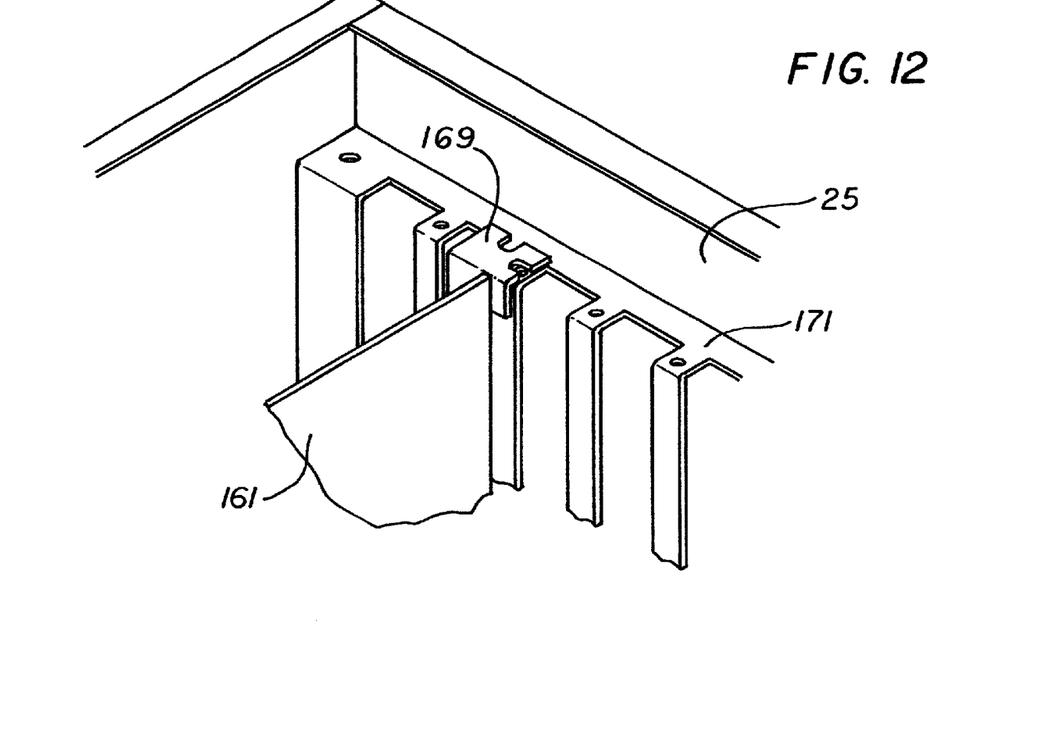
FIG. 12 is an enlarged, fragmentary, top perspective view of the computer system shown in FIG. 11, the computer system being shown with the retaining bracket removed.

Each of I/O boards 161 comprise a comb of printed terminals (not shown) which matingly engage into an associated electrical connector 167 mounted on motherboard 157. Each of I/O boards 161 further comprise a single sheet metal mounting bracket, or bulkhead, 169 affixed along its edge. Metal bracket 169 is disposed on I/O board 161 so as to lie horizontally upon an inwardly protruding flange 171 formed on rear panel 25 of chassis 15, as shown in FIG. 12.

Figure 13:
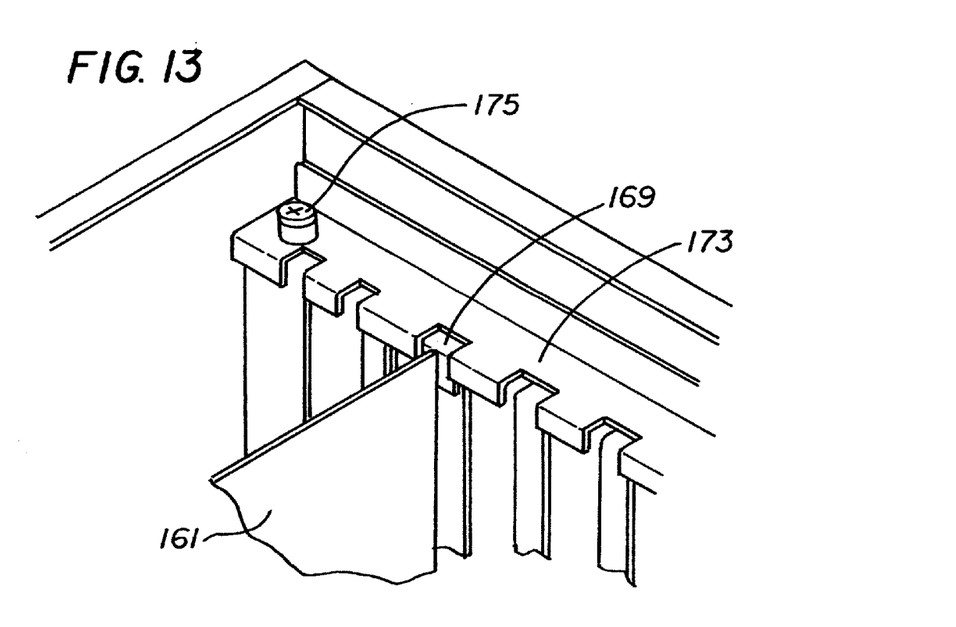
FIG. 13 is an enlarged, fragmentary, top perspective view of the computer system shown in FIG. 11.

Computer system 11 further comprises a, single elongated retaining bracket 173 which is mounted on flange 171 over metal brackets 169 of I/O boards 161. Retaining bracket 173 is fixedly mounted onto flange 171 by a pair of screws 175, thereby securing I/O boards 161 in place down on motherboard 157.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A computer system comprising:
   (a) a housing having a chassis and a cover mounted on the chassis, the chassis comprising an inner surface, an outer surface, a front panel, a rear panel, a bottom panel and a pair of upstanding sidewalls which together define an internal cavity, the front panel of the chassis being shaped to include a power supply receiving channel; and
   (b) a fan pack removably disposed within the internal cavity of the chassis, said fan pack comprising a first stacked pair of individual fan units, a second stacked pair of individual fan units and a fan housing into which said first and second stacked pairs of individual fan units are disposed, said first and second stacked pairs of individual fan units being disposed within said fan housing in a side-by-side relationship.

2. The computer system of claim 1 wherein said fan pack further comprises a third stacked pair of individual fan units disposed within said fan housing, said first, second and third pairs of individual fan units being disposed side-by-side in a row which extends substantially across the width of the internal cavity of the chassis.

3. The computer system of claim 2 wherein each individual fan unit in said first, second and third pairs of individual fan units comprises a housing having a front surface, a rear surface and a central opening and a fan blade assembly rotatably disposed within the central opening.

4. The computer system of claim 1 further comprising a power supply removably disposed within the power supply receiving channel formed in the chassis, said power supply comprising a housing, power supply electronics disposed within the housing and a male electrical connector fixedly mounted on said housing in electrical connection with the power supply electronics, said male electrical connector having alternating and direct current connection pins.

5. The computer system of claim 4 wherein said male electrical connector comprises a frame, a pair of alternating current connector pins positioned within said frame and a plurality of direct current connector pins positioned within said frame.

6. The computer system of claim 5 wherein said pair of alternating current connector pins are spaced apart from the plurality of direct current connector pins.

7. The computer system of claim 6 wherein said pair of alternating current connector pins are configured in a vertical column in spaced apart relation and said plurality of direct current connector pins are configured into eight vertical columns of three pins.

8. The computer system of claim 7 wherein said male electrical connector is sized and shaped to matingly engage with a female electrical connector which is mounted on said chassis and which is disposed to protrude into the power supply receiving channel.

9. The computer system of claim 1 further comprising an indicator unit for displaying the operation state of said computer system.

10. The computer system of claim 10 wherein said indicator unit comprises a printed circuit board having a top surface, a bottom surface and a line of weakness, a display mounted on said printed circuit board and a flexible connector having a first end and a second end, the first and second ends of said flexible connector being coupled to said printed circuit board on opposite sides of the line of weakness.

11. A computer system comprising:
   (a) a housing having a chassis and a cover mounted on the chassis, the chassis comprising an inner surface, an outer surface, a front panel, a rear panel, a bottom panel and a pair of upstanding sidewalls which together define an internal cavity, the front panel of the chassis being shaped to include a power supply receiving channel;
   (b) a fan pack removably disposed within the internal cavity of the housing, said fan pack comprising a first stacked pair of individual fan units; and
   (c) an indicator unit for displaying the operation state of said computer system, said indicator unit comprising a printed circuit board having a top surface, a bottom surface and a line of weakness, a display mounted on said printed circuit board and a flexible connector having a first end and a second end, the first and second ends of said flexible connector being coupled to said printed circuit board on opposite sides of the line of weakness, the line of weakness on said printed circuit board including a groove formed in the top surface of said printed circuit board and a groove formed in the bottom surface of said printed circuit board.

12. A computer system comprising:
   (a) a housing having a chassis and a cover mounted on the chassis, the chassis comprising an inner surface, an outer surface, a front panel, a rear panel, a bottom panel and a pair of upstanding sidewalls which together define an internal cavity, the front panel of the chassis being shaped to include a power supply receiving channel;
   (b) a fan pack removably disposed within the internal cavity of the housing, said fan pack comprising a first stacked pair of individual fan units, a second stacked pair of individual fan units, a third stacked pair of individual fan units and a fan housing into which said first, second and third pairs of individual fan units are disposed in a row, each individual fan unit in said first, second and third pairs of individual fan units comprising a housing having a front surface, a rear surface and a central opening and a fan blade assembly rotatably disposed within the central opening; and
   (c) a media bay assembly slidably disposed within the chassis, said media bay assembly comprising a frame and a disc unit slidably disposed within the frame, the frame comprising a pair of upwardly protruding flanges, each flange having a double-sided adhesive tab secured thereto, the disc unit comprising a circuit board which is disposed to contact the double-sided adhesive tabs secured to each flange.

13. A computer system comprising:
(a) a housing having a chassis and a cover mounted on the chassis, the chassis comprising an inner surface, an outer surface, a front panel, a rear panel, a bottom panel and a pair of upstanding sidewalls which together define an internal cavity, the front panel of the chassis being shaped to include a power supply receiving channel, the rear panel of the chassis being shaped to include an inwardly protruding flange; and
(b) a fan pack removably disposed within the internal cavity of the housing, said fan pack comprising a first stacked pair of individual fan units, a second stacked pair of individual fan units, a third stacked pair of individual fan units and a fan housing into which said first, second and third pairs of individual fan units are disposed in a row, each individual fan unit in said first, second and third pairs of individual fan units comprising a housing having a front surface, a rear surface and a central opening and a fan blade assembly rotatably disposed within the central opening.

14. The computer system of claim 13 further comprising a motherboard disposed within the internal cavity of the chassis, a plurality of input/output boards mounted on said motherboard, each input/output board having a bracket disposed to lie upon the flange on the chassis, and a retaining bracket which is removably mounted on the flange of the chassis over the brackets of said plurality of input/output boards.

* * * * *